E. DAVIS.
INKSTAND.
APPLICATION FILED OCT. 31, 1912.
1,100,421.
Patented June 16, 1914.
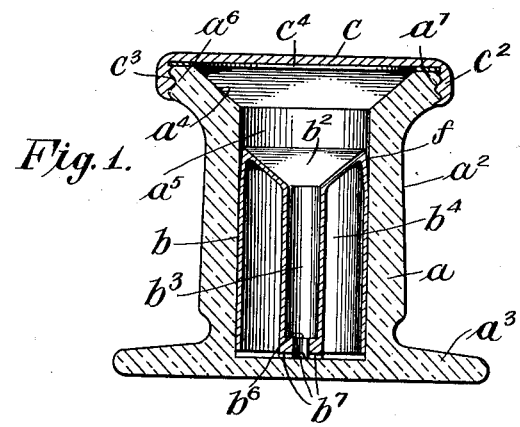
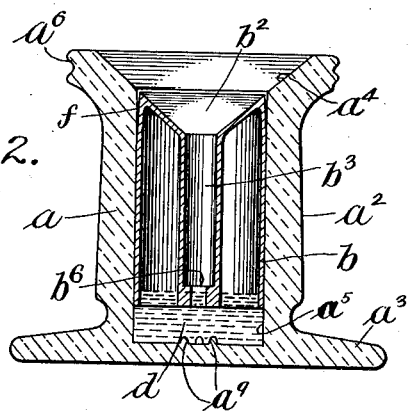
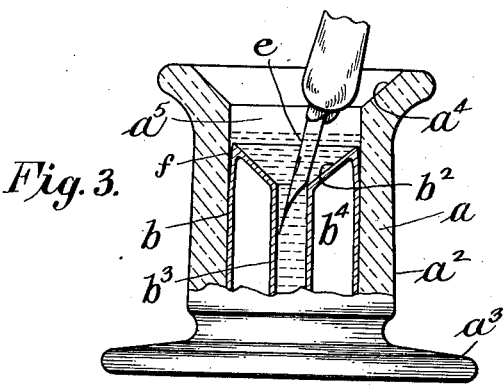
WITNESSES
H. C. Thompson
C. Mulreany
INVENTOR
Emry Davis,
BY
Edgar Tate & Co.
ATTORNEYS.

UNITED STATES PATENT OFFICE.

EMRY DAVIS, OF BROOKLYN, NEW YORK.

INKSTAND.

1,100,421.  Specification of Letters Patent.  Patented June 16, 1914.

Application filed October 31, 1912.  Serial No. 728,781.

*To all whom it may concern:*

Be it known that I, EMRY DAVIS, a citizen of the United States, and residing at Brooklyn, in the county of Kings and State of New York, have invented certain new and useful Improvements in Inkstands, of which the following is a specification, such as will enable those skilled in the art to which it appertains to make and use the same.

This invention relates to inkstands, and particularly to inkstands of the vertically movable plunger float class, such as that described and claimed in U. S. Letters Patent granted to me June 7, 1898, No. 605,177, and the object of this invention is to improve an inkstand of this class and to make the same more efficient and practical in use.

The invention is fully disclosed in the following specification of which the accompanying drawing forms a part, in which the separate parts of my improvement are designated by suitable reference characters in each of the views, and in which:—

Figure 1 is a central vertical section of my improved inkstand and showing the same provided with a detachable cover;—Fig. 2 a view similar to Fig. 1, but with the cover removed and showing the ink in the stand and the operation of the plunger float when the ink is poured into the stand, and Fig. 3 a view similar to Fig. 1, but showing the movement of the plunger float in the operation of inking a pen and showing also a modification in the form of the top of the inkstand.

In the practice of my invention I provide an inkstand comprising a main well or receiver portion $a$ and a vertically movable plunger float $b$ mounted therein, and in the form of construction shown, the main receiver or well $a$ is provided with a removable cap or closure device $c$.

The main receiver or well $a$ comprises an upright body portion $a^2$ having a flaring base $a^3$ and a funnel-shaped or cup-shaped top $a^4$, and the body portion $a^2$ is provided with a central vertical cylindrical chamber $a^5$ the bottom of which is closed but the top of which opens into the funnel-shaped or cup-shaped top $a^4$.

The body portion of the float $b$ is exactly cylindrical in form and the outer diameter thereof is approximately the same as the diameter of the chamber $a^5$, but said float is freely movable vertically in said chamber.

The float $b$ is also tubular in form and provided with a funnel-shaped or cup-shaped top $b^2$ having a central tube $b^3$ which extends downwardly to or approximately to the bottom of the side walls of said float and forms, therein, an annular air chamber $b^4$. The tube $b^3$ is open at the bottom or provided with a vertically arranged port or passage $b^6$, and said tube is provided in the bottom thereof with radial recess $b^7$, in the form of construction shown in Fig. 1, to permit ink poured into the top of the tube $b^3$ to pass out into the chamber $b^4$.

The funnel or cup-shaped top $a^4$ of the body $a^2$ of the receiver is provided, in the construction shown in Figs. 1 and 2, with a rim portion $a^6$ threaded, as shown at $a^7$, and the cap or closure device $c$ is provided with a rim $c^2$ having a corresponding thread $c^3$ and said cap, or closure device is also provided with a gasket $c^4$.

In the use of this inkstand, ink is poured into the top of the plunger float $b$ and flows down through the tube $b^3$ and out into the chamber $b^4$, as shown at $d$ in Fig. 2, and this operation continues until the plunger float $b$ rises into the position shown in said figure in which the funnel or cup-shaped top $a^4$ of the body $a^2$ of the receiver or well and the funnel or cup-shaped top $b^2$ of the plunger form a complete cup, and when the plunger reaches this position the pouring in of the ink is stopped and the device is ready for use.

In the operation of inking a pen, the pen is inserted into the top of the plunger float, as shown at $e$ in Fig. 3, and said plunger float is depressed and the ink which cannot rise in the chamber $b^4$ rises in the tube $b^3$ and into the cup-shaped top of the plunger float, as clearly shown in said figure, and when the pen is removed the plunger float again rises into the position shown in Fig. 2, and this operation may be repeated whenever necessary.

In the construction shown, the top of the plunger float is tapered slightly, as shown at $f$, so as to form a thin space between the same and the walls of the chamber $a^5$, and this, in the operation of said plunger, helps to prevent the ink from drying on the top walls of the plunger and on the walls of the chamber $a^5$ and thus interfering with the movement of the plunger, but this tapering of the top walls of the plunger $b$ is not absolutely essential and said walls of the said plunger may be of the same transverse dimensions throughout its length if desired, and it will also be understood that in the operation of the plunger a thin film of ink is formed between the walls thereof and the walls of the chamber $a^5$ and this keeps said plunger thoroughly lubricated at all times.

While I have described the preferred method of operating my improved inkstand, it will be understood that sufficient ink may be poured into the well or into the chamber $a^5$ through the tube $b^3$ of the plunger $b$ to raise said plunger above the position shown in Fig. 2, without materially interfering with the inking of a pen which must always be inserted into the plunger, but in practice, I prefer the method of operation hereinbefore described in which only sufficient ink is poured into the well to raise the plunger to the position shown in Fig. 2, as this facilitates the insertion of the pen and the depressing of the plunger, as shown in Fig. 3. It will also be understood that the plunger $b$ is removable and may be withdrawn from the body $a^2$ of the receiver or well whenever desired for cleaning or other purposes.

By using the cap or closure device $c$ shown in Fig. 1, my improved inkstand may be securely closed and may thus be carried in the pocket, a handbag, or in any other way, but this invention is not limited to the use of said closure cap and if desired the funnel or cup-shaped top $a^4$ of the body portion of the receiver or well may be made as shown in Fig. 3, and a slip cap or other closure device may be employed if desired, or said inkstand may be used without a cap or closure device.

In the construction shown in Fig. 1, the bottom of the tube $b^3$ of the plunger float extends a little below the bottom of the side walls of said float and said tube is provided in the bottom thereof with radial notches or recesses $b^7$ to permit the ink to flow from said tube into the chamber $b^4$, but this construction is not absolutely necessary and transverse grooves may be provided in the bottom of the chamber $a^5$, or any suitable construction may be employed to permit the ink to flow from the tube $b^3$ into the chamber $b^4$ in the operation of pouring in the ink as hereinbefore described. The extension of the tube $b^3$ below the bottom of the outer walls of the plunger $b$, as shown in Fig. 1, also operates to facilitate the action of said plunger as it prevents suction at the bottom of the plunger which would operate to hold it down, but this same result may be accomplished by providing the bottom of the chamber $a^5$ with knobs or projections $a^9$ as shown in Fig. 2, and on which the lower end of the tube $b^3$ would rest when the plunger is in its lowest position, and with this form of construction, the radial notches or recesses $b^7$ in the bottom of the tube $b^3$ will not be necessary as the knobs or projections $a^9$ on the bottom of the tube $b^3$ will hold the plunger in the desired position and also permit the ink to flow out from the tube $b^3$ into the chamber $a^5$ in the operation of pouring ink into the well, as hereinbefore described.

In the construction shown, the vertical depth of the plunger float $b$ is about four-fifths of that of the chamber $a^5$ in which it is placed, but these comparative depths or dimensions of said parts may be varied as will be readily understood.

Having fully described my invention what I claim as new and desire to secure by Letters Patent is:—

An inkstand comprising a main cylindrical well or receiver portion, a funnel-shaped top and a vertical cylindrical chamber into which said top opens, a vertically movable cylindrical and hollow float placed in said chamber and closely fitting the walls thereof, said float being provided with a cup-shaped top of the same diameter as the body thereof and provided with a central tube which extends downwardly therethrough and the bottom of which is open, the top of the float forming in one position thereof a bottom for the funnel-shaped top of the well or receiver, and the depth of the float being less than the depth of said chamber, said float with its funnel-shaped top being insertible into, vertically movable in, and removable through the top of said chamber.

In testimony that I claim the foregoing as my invention I have signed my name in presence of the subscribing witnesses this 29th day of October, 1912.

EMRY DAVIS.

Witnesses:
 C. MULREANY,
 S. ANDREWS.